(12) United States Patent
Park et al.

(10) Patent No.: US 7,669,393 B2
(45) Date of Patent: Mar. 2, 2010

(54) STALL DETECTION SYSTEM FOR MOWER BLADE CLUTCH ENGAGEMENT

(75) Inventors: David G. Park, Fuquay-Varina, NC (US); Carl S. Silbernagel, Fort Mill, SC (US)

(73) Assignee: Deere & Company, Moline, IL (US)

( * ) Notice: Subject to any disclaimer, the term of this patent is extended or adjusted under 35 U.S.C. 154(b) by 2 days.

(21) Appl. No.: 12/117,472

(22) Filed: May 8, 2008

(65) Prior Publication Data

US 2009/0277743 A1 Nov. 12, 2009

(51) Int. Cl.
*A01D 41/14* (2006.01)
*A01D 41/127* (2006.01)
*A01D 46/08* (2006.01)

(52) U.S. Cl. .................. 56/10.2 R; 192/18 A; 192/82 T

(58) Field of Classification Search ................ 192/18 A, 192/18 R, 85 V, 82 T, 102 R, 84.1, 54.1, 103 C, 192/82 R, 21.5, 84.2, 84.9; 477/175, 179; 56/11.8, 10.2 R See application file for complete search history.

(56) References Cited

U.S. PATENT DOCUMENTS

| | | | | |
|---|---|---|---|---|
| 2,490,894 A | * | 12/1949 | Zink et al. ................... 56/15.6 |
| 3,606,742 A | * | 9/1971 | Wieneke et al. ................. 460/4 |
| 4,734,817 A | * | 3/1988 | Baker et al. ................... 361/190 |
| 4,905,801 A | * | 3/1990 | Tezuka ......................... 477/87 |
| 4,928,458 A | | 5/1990 | Muroya et al. |
| 4,977,988 A | * | 12/1990 | Tanaka ......................... 477/87 |
| 5,094,332 A | * | 3/1992 | Wall ......................... 192/82 T |
| 6,460,670 B2 | | 10/2002 | Schaedler |
| 6,886,315 B1 | * | 5/2005 | Hauser et al. ................. 56/11.8 |
| 7,266,938 B1 | | 9/2007 | Hauser et al. |
| 2005/0066643 A1 | * | 3/2005 | Fukushima et al. .......... 56/16.7 |
| 2007/0289281 A1 | * | 12/2007 | Altepost et al. ................. 56/64 |

FOREIGN PATENT DOCUMENTS

EP 0 154 230 3/1991

* cited by examiner

*Primary Examiner*—Árpád Fábián-Kovács

(57) ABSTRACT

A stall detection system for mower blade clutch engagement determines if there is a stall condition by sensing one or more operating conditions such as engine deceleration or blade spindle rotation. If a stall condition is detected, a microcontroller shuts off actuating current to the electric clutch coil and automatically disengages or discontinues engagement of the clutch. The microcontroller may also provide a signal to inform the operator of the stall condition, and prevent repeated activation of the clutch until the stall condition is corrected.

13 Claims, 4 Drawing Sheets

STALL DETECTION SYSTEM FOR MOWER BLADE CLUTCH ENGAGEMENT

FIELD OF THE INVENTION

This invention relates to mowing machines for cutting grass and other vegetation, and more specifically to electromagnetic clutches for transmission of power from a lawn mower engine to mower blades.

BACKGROUND OF THE INVENTION

Electromagnetic clutches typically are used to transmit power from a lawn mower engine to two or more cutting blades mounted on spindles under a mower deck. The electromagnetic clutches are designed to engage very quickly to minimize clutch plate wear. However, a disadvantage of the sudden engagement is that engine speed may droop. As a result, the mower deck may vibrate and shake until the rotational speed of the blades and spindles increases sufficiently. Until the blades reach the desired speed, the belt or belts may slip on the pulleys mounted on the drive shaft and blade spindles.

Electromagnetic clutches for mower blades may be engaged by actuating a push button or toggle PTO switch. If the operator notices significant engine speed droop when actuating the PTO switch, he or she may then turn off the switch to disengage the clutch before the engine stalls, either before or shortly after clutch lockup. If the operator repeatedly flips the PTO switch to attempt re-engaging the clutch to mate up the engine to a stalled load, the useful life of the clutch will be greatly reduced.

A stalled load, or stall condition, may be a mower blade that is stuck against an obstruction on the ground under the mower deck, or a mower blade that encounters high resistance rotating through a build-up of grass clippings or debris on the undersurface of the deck. These and other stall conditions can significantly slow or stop rotation of rotary cutting blades. Attempts to engage and re-engage the mower blade clutch while a stall condition exists increases clutch wear.

In the past, attempts to address the mower blade clutch engagement problem have not been very effective or economical. One approach is to size the electromagnetic clutch with sufficient capacity to stall the engine without slipping the clutch, requiring a more costly clutch assembly. Another approach is to provide a clutch that allows the belt to slip significantly before the engine stalls. However, the belt may wear excessively before the operator notices the belt slipping or smells the belt burning, and then uses the PTO switch to disengage the clutch.

Soft engagement devices also exist for electromagnetic clutches to reduce sudden clutch engagement, by modulating the voltage applied to the electromagnetic coils of the clutch. The electronic modules allow the clutch plates to slip for a period, while reducing the engine droop and other undesirable characteristics of the hard start. However, the clutch may be susceptible to wear during use of a soft engagement device.

A system is needed to reduce wear to an electromagnetic clutch for transmission of power from a lawn mower engine to mower blades, and to prevent attempted repeated engagement of the clutch while a stall condition exists.

SUMMARY OF THE INVENTION

A stall detection system for mower blade clutch engagement includes a PTO switch that may be actuated to engage a mower blade to a power source, a sensor for sensing an operating condition of the power source or mower blade, and a microcontroller connected to the sensor and the PTO switch. The microcontroller determines if the operating condition from the sensor satisfies a predetermined criteria during an interval after engagement of the PTO switch, and de-actuates the PTO switch to disengage the mower blade from the power source if the operating condition fails to satisfy the criteria. The stall detection system reduces wear to an electromagnetic clutch for transmission of power to mower blades, and prevents attempted repeated engagement of the clutch while a stalled load or stall condition exists.

DESCRIPTION OF THE PREFERRED EMBODIMENT

Figure 1:
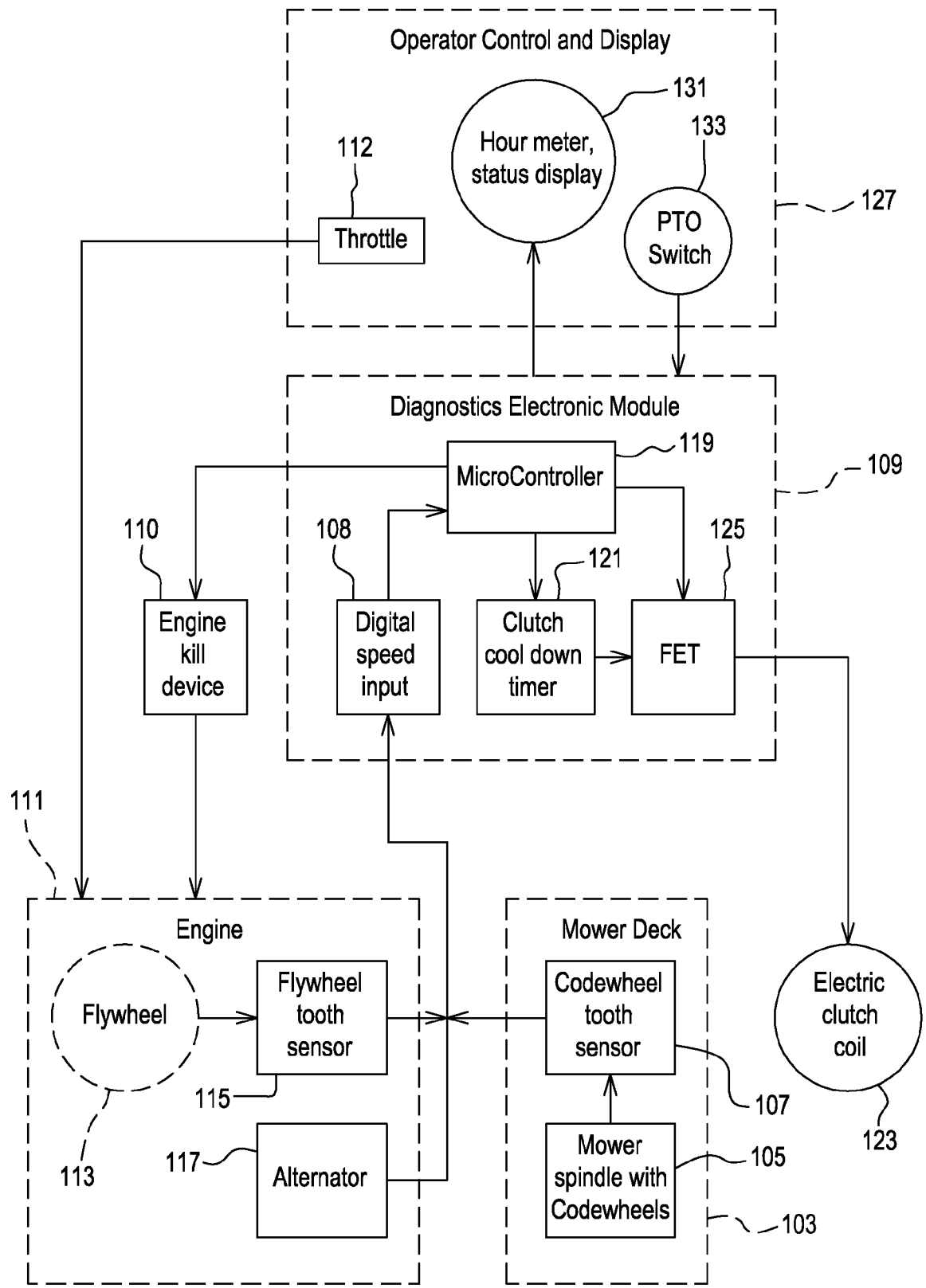
FIG. 1 is a block diagram of a stall detection system for mower blade clutch engagement according to a first embodiment of the invention.

In one embodiment, as shown in FIG. 1, stall detection system 101 is provided for a counter-rotating, rear discharge/rear collection mower deck 103. The mower deck may be used in a variety of different mowing vehicles or walk-behind mowers, and in a variety of different mower configurations. For example, one, two, or more decks may be attached to a vehicle. Mower deck 103 may be a two-chamber deck; i.e., with two cutting blades and spindles; and may be positioned at or adjacent the front, middle, or rear of the vehicle. However, in an alternative embodiment, the mower deck may have three or more chambers, each chamber having a cutting blade attached to a spindle.

In one embodiment, stall detection system 101 utilizes one or more sensors of operating conditions of a mower and provide input to microcontroller 119 in diagnostics control module 109 to determine if a stall condition exists during mower blade clutch engagement. The mower operating conditions are detected by the sensors to indicate if there is a stalled load, or stall condition, such as, but not limited to, obstructions on the ground under the mower deck, or build-up of grass clippings or debris on the undersurface of the deck. In general, stall conditions are operating conditions of the mower that significantly slow or stop rotation of rotary cutting blades.

The microcontroller may apply the input from one or more sensors to preprogrammed software logic that performs the following steps during a time period after operator actuation of PTO switch 133. Initially, when the operator actuates PTO switch 133 to provide electric power to electric clutch coil 123 for engaging the mower blade clutch, the microcontroller compares the sensor input to one or more criteria to determine if a stall condition exists. The microcontroller performs the assessment or comparison before a stall condition brings engine 111 to a stop, and preferably before clutch lockup. Additionally, if the microcontroller determines a stall condition exists during mower blade clutch engagement, the microcontroller provides a signal to FET 125 to shut off power to electric clutch coil 123, discontinuing engagement of the clutch before the engine stalls. Discontinued engagement preferably is done before clutch lockup, but alternatively the microcontroller may provide a signal to disengage the clutch shortly after lockup.

In one embodiment, if the microcontroller switches off power to the electric clutch coil due to a stall condition, the operator may actuate the PTO switch a second time in an attempt to engage the mower blade clutch. The second time the operator actuates the PTO switch, the microcontroller again determines if a stall condition exists, and switches off power to the electric clutch coil before the engine stops. The operator may actuate the PTO switch a third time and, if a stall condition exists, the microcontroller switches off power to the clutch coil before the engine stops.

In one embodiment, each time the microcontroller determines a stall condition exists and switches off power to the electric clutch coil, a counter is incremented. After the counter reaches a preselected number, such as three, the microcontroller shuts off electric power to the engine ignition or shuts off the fuel supply to bring the engine to a stop. As a result, if an operator attempts more than three engagements of the mower blade clutch but each time a stall condition is detected, the microcontroller provides a signal causing the engine to stop. Alternatively, the microcontroller may provide a warning signal to the operator or disable the electric clutch coil for a specified period if the operator attempts another engagement of the clutch after three detected stall conditions. If, however, the clutch engagement is successful during one of the three attempted engagements, the increment counter is set back to zero.

In one embodiment, the stall detection system 101 senses the rotational speed of a blade spindle of mower deck 103. The spindle may have a first or upper end with a belt driven pulley attached thereto, and a second or lower end with a rotary cutting blade attached thereto for cutting grass. The spindle also may be equipped with a code wheel 105. A code wheel tooth sensor 107 may be mounted on the mower deck adjacent the spindle to detect the rotational speed of the code wheel. The code wheel tooth sensor may be electrically connected to digital speed input 108 of diagnostics electronic module 109. The code wheel tooth sensor may produce pulses that are indicative of the rotational speed of the spindle. The microcontroller determines if the rotational speed of the spindle meets one or more preselected criteria. For example, if the sensed rotational speed of the spindle does not increase to a preselected rpm (e.g., 1000 rpm) after a preselected time period (e.g., 0.5 second) after the operator actuates the PTO switch, the microcontroller may be programmed to determine that a stall condition exists before clutch lockup. Alternatively, if the sensed spindle does not accelerate sufficiently (e.g., increased rotational speed of at least 500 rpm per second), the microcontroller may determine that a stall condition exists, even after clutch lockup.

In a second embodiment, stall detection system 101 senses the rotational speed of internal combustion engine 111 or other power source. For example, the rotational speed of engine flywheel 113 may be sensed by flywheel tooth sensor 115. The flywheel tooth sensor may be electrically connected to digital speed input 108 of the diagnostics electronic module. The flywheel tooth sensor may produce pulses indicative of the rotational speed of the engine. The microcontroller then determines if the rotational speed of the engine flywheel meets one or more preselected criteria. For example, if the sensed rotational speed of the engine decreases below a preselected rpm (e.g., 1000 rpm) during a preselected time period (e.g., 0.5 second) after the operator actuates the PTO switch, the microcontroller may be programmed to determine that a stall condition exists. Alternatively, if the engine decelerates too fast (e.g., a decrease of more than 2500 rpm) during a preselected time period (e.g., 0.5 second) after the operator actuates the PTO switch, the microcontroller also may determine a stall condition exists. Preferably, the preselected time period when a stall condition can be detected is before clutch lockup.

Additionally, in one embodiment, the microcontroller not only may determine if a stall condition exists before clutch lockup, but also if a stall condition exists shortly after clutch lockup, and then disengage the clutch. For example, if the engine does not increase to a preselected rpm (e.g., 1500 rpm) after a preselected time period (e.g., 1 second) after the operator actuates the PTO switch, the microcontroller may be programmed to determine that a stall condition exists. Alternatively, if the engine does not accelerate sufficiently (e.g., an increase of at least 250 rpm per second), the microcontroller may determine that a stall condition exists.

In a third embodiment, stall detection system 101 senses the rotational speed of alternator 117. The alternator may be electrically connected to digital speed input 108 of the diagnostics electronic module, and may produce pulses similar to the engine speed sensor. The microcontroller determines if the rotational speed of the alternator satisfies one or more preselected criteria. The criteria may include those identified above for the engine. If the pulses from the alternator indicate the speed has decreased or decelerated more than a specified amount shortly after PTO switch actuation, the microcontroller may be programmed to determine that a stall condition exists.

In one embodiment, diagnostics control module 109 includes microcontroller 119 which receives digital electronic input signals from one or more of the sensors described above through digital speed input 108. The microcontroller may be an 8 bit controller with "capture" capability that allows the microcontroller to accurately measure the time between pulses in a pulse train from an engine flywheel sensor, alternator coils, or a deck spindle sensor. The microcontroller provides an output to FET 125 which provides the appropriate power to the electric clutch coil to engage or disengage the electromagnetic clutch based on the digital input from one or more sensors.

In one embodiment, operator control and display 127 may include throttle control 112 which may be mechanically or electromechanically linked to the engine to increase or decrease the fuel supply to the engine and thereby increase or decrease engine speed. The operator control and display also may include hour meter and status display 131 which may be electrically connected to diagnostics electronic module 109 to provide cumulative running time of the engine and show if the PTO is presently engaged or disengaged. Additionally, the operator control and display may include PTO switch 133 which may be electrically connected to the diagnostics electronic module and may be used by the operator to initiate control logic for providing power to the electric clutch coil.

In one embodiment, control logic in microcontroller 119 may detect a stall condition, provide a signal through FET to automatically deactivate current through the clutch coil to disengage or discontinue engagement of the clutch, inform the operator of the stall condition, and shut down the engine through engine kill switch 110 after the operator attempts to engage the clutch repeatedly (e.g., more than three times) under a stall condition. Engine kill switch 110 may block ignition or fuel to the engine combustion chambers. Alternatively, instead of shutting down the engine after several sensed stall conditions, the microcontroller may trigger a warning on the operator control and display, and/or disable the clutch for a predetermined period of time, or cool down period. Clutch cool down timer 121 may specify the time period during which actuation of the PTO switch is blocked from energizing clutch coil 123.

Figure 2:
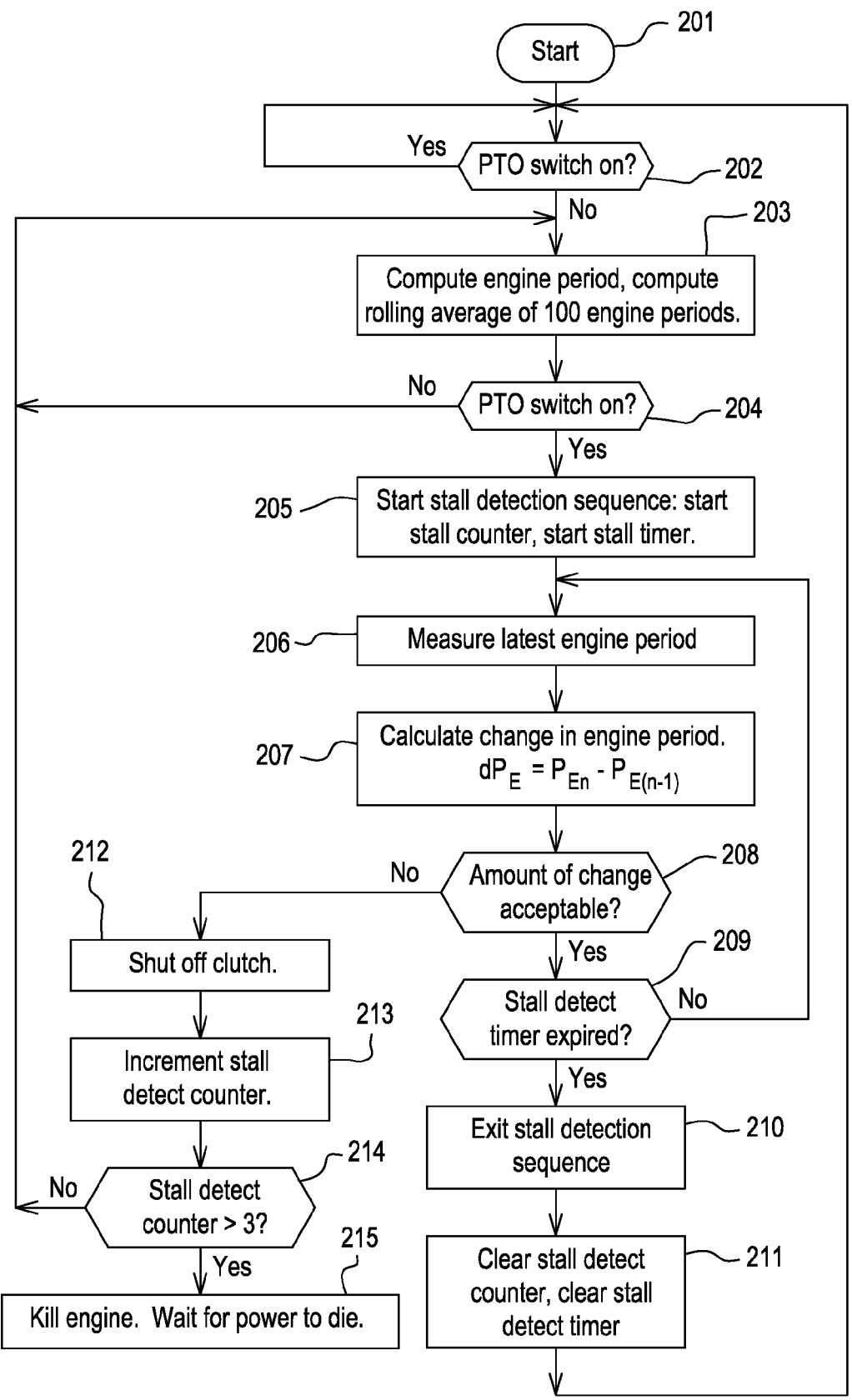
FIG. 2 is a logic diagram of a stall detection system for mower blade clutch engagement according to a first embodiment of the invention.
Figure 3:
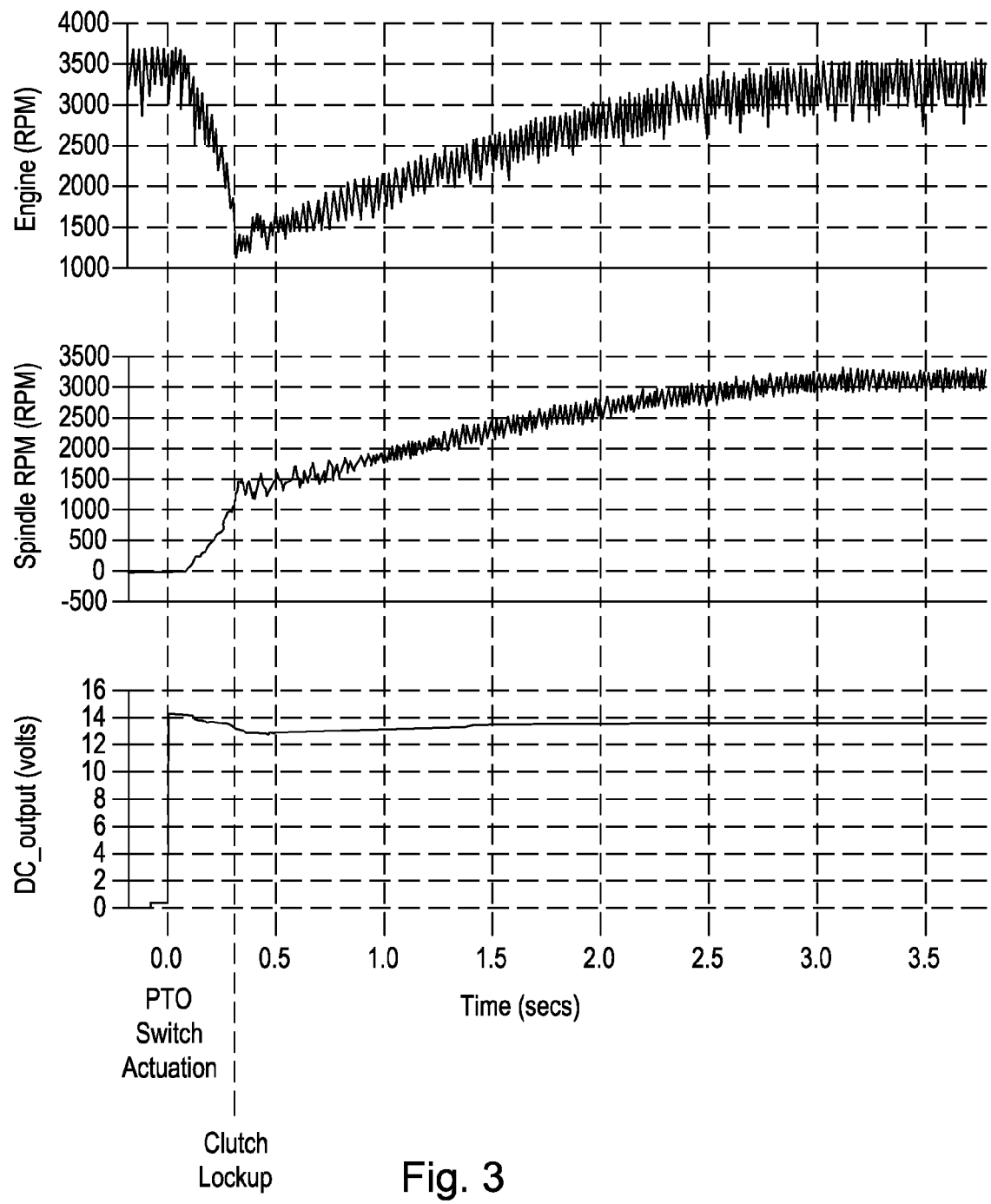
FIG. 3 is a graph of engine rpm, spindle rpm, and PTO voltage in relation to time before and after actuation of a PTO switch, and clutch lockup, of a typical mower deck without a stall condition.

In one embodiment, as shown in FIG. 2, control logic is shown in a flow diagram for an embodiment of the invention that senses engine speed to determine if a stall condition exists. The control logic starts in block 201 when the diagnostics control module of a mower is powered on. In block 202, the microcontroller determines if the PTO switch is already on. If the PTO switch is already on, the logic returns to block 202. If the PTO switch is off, the engine period is computed, and the rolling average of a fixed number (e.g., 100) of engine periods also may be computed.

Figure 4:
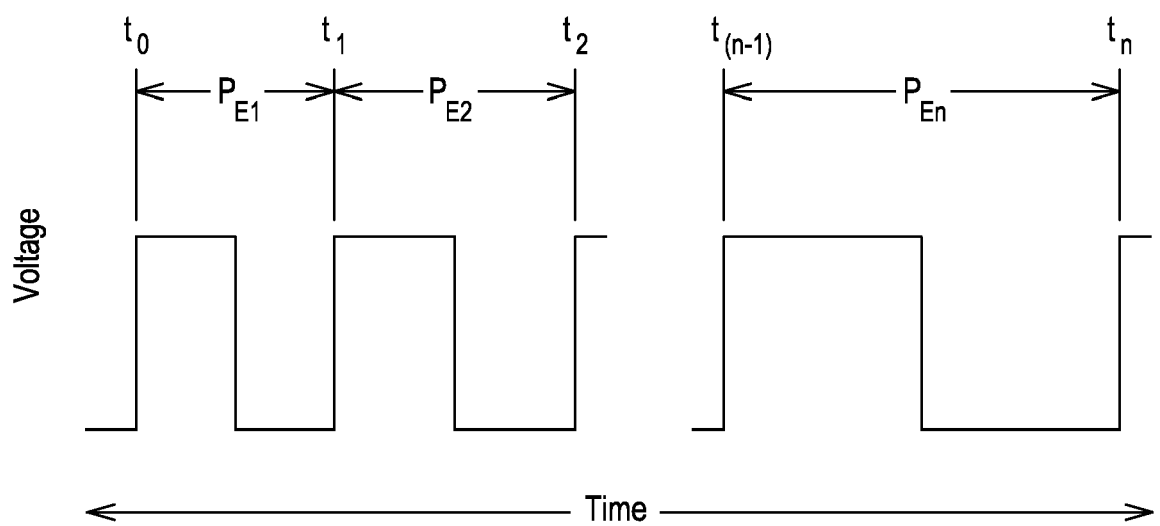
FIG. 4 is a pulse train diagram illustrating a sequence of pulses from an engine operating condition sensor of a mower that may be used to determine if a stall condition exists.

Now referring to FIG. 4, engine period is a time value which can be measured in microcontroller instruction executions, and the engine period for the $n^{th}$ period may be expressed as $P_{En} = t_n - t_{(n-1)}$ where $t_n$ is the time of the $n^{th}$ pulse and $t_{(n-1)}$ is the time of the immediately preceding pulse. When a pulse is seen by the microcontroller, the current value of the timer is captured and stored in a register. When the next capture event occurs, the period is the difference between the two time values, measured in units of microcontroller instruction executions. Measuring the period of successive pulses is the inverse of speed. Engine period may be converted using known constants to engine speed in units of rpm or Hertz, but is not necessary for executing the control logic of the invention.

Referring again to FIG. 2, in block 204, the microcontroller again determines if the PTO switch is already on. If the PTO switch is already on, the logic returns to block 203. The microcontroller may execute the steps of blocks 201-204, before entering the stall detection sequence in block 205, even if the PTO switch is not actuated.

If the PTO switch is off, in block 205 the stall detection sequence is started, including starting the stall counter and stall timer. The stall timer assures the system senses for stall conditions only during a specified time period after the operator actuates the PTO switch. The stall counter counts the number of times a stall condition is detected following actuation of the PTO switch.

In block 206, the latest engine period is measured. In block 207, the change in engine period is calculated. The change in engine period of the $n^{th}$ period from the immediately preceding period may be expressed as $dP_E = P_{En} - P_{E(n-1)}$. In block 208, the microcontroller determines if the amount of change in engine period indicates an engine stall condition or not. The microcontroller may compare the change $dP_E$ to one or more preselected stored values. If the change in engine period indicates no stall condition, in block 209 the microcontroller checks if the stall detect timer has expired. The stall detect timer, which was started in block 205, may run for a preselected interval (e.g., 3 seconds) after actuation of the PTO switch, during which time the microcontroller receives sensor information to determine if a stall condition exists. If the stall detect timer has expired, in block 210 the stall detection sequence is exited, in block 211 the stall detect counter and stall detect timer are cleared, and the logic returns to block 202.

However, if the change in engine period indicates engine speed has dropped too sharply, in excess of the preselected amount, in block 212 the microcontroller provides a signal through FET 125 to shut off power to electric clutch coil 123, disengaging the clutch. In block 213, the stall detect counter is incremented by one. In block 214, the microcontroller determines if the stall detect counter has reached a value greater than three. If it has not, the logic returns to block 203. The operator then may elect to actuate the PTO switch again, in which case the logic reenters the stall detection sequence described above.

In block 214, if the stall detect counter indicates a value greater than three, the microcontroller sends a signal to engine kill switch to shut off the engine ignition or fuel to stop the engine. Alternatively, or additionally, a warning signal may be provided to the operator control and display, or the electric clutch coil may be deactivated for a specified period of time.

Having described the preferred embodiment, it will become apparent that various modifications can be made without departing from the scope of the invention as defined in the accompanying claims.

The invention claimed is:

1. A stall detection system for mower blade clutch engagement, comprising:
   a PTO switch that is actuatable to provide electrical power to an electric clutch coil;
   a sensor that senses an operating condition of a mower following actuation of the PTO switch;
   a microcontroller that receives an input from the sensor and compares the input to a preselected criteria to determine if a stall condition exists, and if the stall condition exists, provides a signal to discontinue electrical power to the electric clutch coil; and
   an engine kill switch actuated by the microcontroller if the stall condition exists following actuation of the PTO switch a specified number of times.

2. The stall detection system of claim 1 further comprising a timer to limit the interval during which the microcontroller compares the input to a preselected criteria following actuation of the PTO switch.

3. The stall detection system of claim 1 wherein the sensor is a flywheel tooth sensor.

4. The stall detection system of claim 1 wherein the sensor is a codewheel tooth sensor on a mower spindle with codewheels.

5. The stall detection system of claim 1 wherein the sensor is an alternator driven by an engine.

6. The stall detection system of claim 1 wherein the microcontroller provides a signal disabling the electric clutch coil for a preselected time period once the stall condition exists following actuation of the PTO switch a specified number of times.

7. A stall detection system for mower blade clutch engagement, comprising:
   an electric clutch coil transmitting power from an engine to a mower deck in response to actuation of a PTO switch;
   a sensor for sensing an operating condition of the mower deck;
   a microcontroller connected to the sensor and to the electromagnetic clutch to disengage the electromagnetic clutch if the operating condition indicates a stall condition; and
   an engine kill switch actuated by the microcontroller if the stall condition exists upon actuation of the PTO switch a specified number of times.

8. The stall detection system of claim 7 wherein the sensor is a flywheel tooth sensor.

9. The stall detection system of claim 7 wherein the stall condition is an engine speed decrease that is greater than a preselected speed decrease.

10. The stall detection system of claim 7 wherein the sensor is a codewheel tooth sensor on a mower spindle with codewheels.

11. A stall detection system for mower blade clutch engagement, comprising
a PTO switch that may be actuated to engage a mower deck to a power source;
a sensor for sensing an operating condition of the power source or the mower deck;
a microcontroller connected to the sensor and the PTO switch, and determining if the operating condition provided by the sensor satisfies a predetermined criteria during an interval after engagement of the PTO switch, and de-actuating the PTO switch to disengage the mower blade from the power source if the operating condition fails to satisfy the criteria; and
an engine kill switch actuated by the microcontroller if the operating condition fails to satisfy the criteria after engagement of the PTO switch a specified number of times.

12. The stall detection system of claim 11 wherein the operating condition is a change in the period between pulses from the power source.

13. The stall detection system of claim 11 further comprising a display indicating if the operating condition satisfies the criteria.

* * * * *